United States Patent
Tamaki et al.

(10) Patent No.: US 7,190,483 B2
(45) Date of Patent: Mar. 13, 2007

(54) IMAGE RECORDER

(75) Inventors: Eiichi Tamaki, Kyoto (JP); Takahide Hirawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 927 days.

(21) Appl. No.: 09/939,626

(22) Filed: Aug. 28, 2001

(65) Prior Publication Data
US 2002/0054392 A1 May 9, 2002

(30) Foreign Application Priority Data
Aug. 28, 2000 (JP) .......................... P2000-256736

(51) Int. Cl.
*G06F 15/00* (2006.01)
(52) U.S. Cl. .................. 358/1.7; 358/1.2; 359/204; 347/221; 347/239; 347/240; 347/251; 347/254; 347/255
(58) Field of Classification Search ............... 358/1.7; 347/221, 239, 240, 251, 254, 255; 359/204
See application file for complete search history.

(56) References Cited

U.S. PATENT DOCUMENTS

| | | | | |
|---|---|---|---|---|
| 4,060,323 A | * | 11/1977 | Hirayama et al. | 355/60 |
| 5,392,060 A | | 2/1995 | Imakawa | |
| 5,453,778 A | * | 9/1995 | Venkateswar et al. | 347/239 |
| 5,459,492 A | * | 10/1995 | Venkateswar | 347/253 |
| 5,949,526 A | * | 9/1999 | Koguchi | 355/47 |
| 5,982,553 A | * | 11/1999 | Bloom et al. | 359/627 |
| 6,121,996 A | | 9/2000 | Gelbart | |
| 6,175,440 B1 | * | 1/2001 | Conemac | 359/204 |
| 6,342,960 B1 | * | 1/2002 | McCullough | 398/79 |

FOREIGN PATENT DOCUMENTS

| | | |
|---|---|---|
| EP | 0 640 488 A2 | 3/1995 |
| EP | 0 823 810 A2 | 2/1998 |
| WO | WO 00/20912 | 4/2000 |

OTHER PUBLICATIONS

R.W. Corrigan, et al., "An Alternative Architecture for High-Performance Display", SMPTE Journal, Jul. 2000, vol. 109, No. 7, pp. 568-572, XP000950345.

* cited by examiner

*Primary Examiner*—Twyler Lamb
*Assistant Examiner*—Mark R. Milia
(74) *Attorney, Agent, or Firm*—McDermott Will & Emery LLP

(57) ABSTRACT

An illumination lens applies a laser beam emitted from a laser light source onto a light valve. The laser beam divided into a number of beams and modulated in the light valve is reflected by a total internal reflection prism so that the optical path thereof is bent, and thereafter passes through a zoom lens to be focused on a recording medium mounted on the surface of a drum. At this time, an image of a single pixel is recorded with a plurality of adjacent laser beams in a subscanning direction (direction of arrangement of the laser beams). The image can be recorded on the recording medium with sufficient power density.

8 Claims, 8 Drawing Sheets

IMAGE RECORDER

BACKGROUND OF THE INVENTION

1. Field of the Invention

The present invention relates to an image recorder recording an image with a plurality of light beams.

2. Description of the Background Art

A light emitting diode (LED) array or a laser array capable of emitting a plurality of light beams is employed as a light source applied to such an image recorder. The light beams emitted from the light emitting diode array or the laser array can be modulated independently of each other.

There has been proposed an image recorder employing a bar laser (broad area semiconductor laser) linearly formed with a number of emitters as a light source and a spatial light modulator for dividing a light beam emitted from the bar laser into a plurality of light beams and modulating the plurality of light beams independently of each other.

While a light emitting diode array having a relatively large number of elements can be implemented, the brightness (power) of each element is so low that the light emitting diode array can be applied only to a recording material having high sensitivity. While a laser array capable of emitting a laser beam of a relatively high output from each element has been developed, the total output of the laser array is insufficient due to a relatively small number of elements such that an image cannot be recorded on a low-sensitive recording medium of a thermal material or the like at a sufficient speed with the laser array, since image-recording on the thermal material is attained by converting the energy of a light beam to heat, for example.

On the other hand, a bar laser having a high output has been developed and hence an image can be recorded also on a recording medium having relatively low sensitivity when the bar laser is employed along with a spatial light modulator. When a light beam emitted from the bar laser is divided into a number of light beams by the number of elements of the spatial light modulator, however, the power of the light beam per element, i.e., the power for recording an image of a single pixel is disadvantageously reduced.

Thus, the image cannot be recorded on the recording medium having low sensitivity at a high speed even if the bar laser is used. When a thermal material is employed as a recording material, sensitivity is reduced to cause reciprocity law failure if the light beam has low illuminance. In this case, the image cannot be properly recorded on the recording medium even if the image recording speed is reduced.

SUMMARY OF THE INVENTION

The present invention is directed to an image recorder optically scanning an image recording medium in a main scanning direction and a subscanning direction for recording an image on the image recording medium.

According to the present invention, the image recorder comprises a light source emitting a first light beam, a spatial light modulator dividing the first light beam into a plurality of second light beams arranged at least in a subscanning direction while modulating the plurality of second light beams in response to image signals, a focusing optical system focusing the plurality of second light beams on a recording medium and a main scanning system for scanning the recording medium with the plurality of second light beams in a main scanning direction. The plurality of second light beams are classified into a plurality of light beam sets. Each light beam set consists of N light beams adjacent to each other in the subscanning direction, where the number N is an integer of at least two. The plurality of light beams belonging to each light beam set are modulated by an image signal for a single pixel, so that each pixel on the recording medium is recorded by a corresponding single light beam set.

The image recorder records an image of a single pixel with the N light beams adjacent to each other in the subscanning direction, whereby the image can be recorded on the recording medium with sufficient power density.

Preferably, the image recorder satisfies the following condition:

$$La \leq Lb \leq (N \times La)$$

where

La represents the size of a beam spot, formed by each second light beam on the recording medium, in the subscanning direction, and Lb represents the size of the beam spot in the main scanning direction. According to this condition, the image can be precisely recorded with necessary power density.

Preferably, the image recorder further comprises a numerical value changing element for changing the number N in response to light intensity required for image recording and a magnification changing element for changing a focusing magnification by the focusing optical system in response to the number N changed by the numerical value changing element. Thus, the image can be recorded regularly with constant resolution regardless of the required intensity of the light beam.

The spatial light modulator may be a Grating Light Valve™, manufactured by Silicon Light Machines, Sunnyvale, Calif., so that the recorded image can be effectively prevented from deterioration resulting from discernible boundaries between adjacent beams for recording the image of the pixel.

According to another aspect of the present invention, an image recorder optically scanning an image recording medium in a main scanning direction and a subscanning direction for recording an image on the image recording medium comprises a light source emitting a plurality of modulated light beams from a plurality of light emitting devices arranged in the subscanning direction, a focusing optical system focusing the plurality of light beams on a recording medium and a main scanning system for scanning the recording medium with the plurality of light beams in the main scanning direction. The plurality of light beams constitute beam subsets. Each subset consists of N adjacent light beams in the subscanning direction, where the number N is an integer of at least two. The plurality of light beams belonging to each subset are modulated by an image signal corresponding to a single pixel so that each pixel on the recording medium is recorded by a corresponding single subset.

According to another aspect of the present invention, an image recorder for recording an image on an image recording medium comprises a photo-generator generating a subset composed of a plurality of light beams subjected to a same modulation, a focusing optical system focusing the light beam set on the image recording medium and a scanning mechanism scanning the image recording medium with the subset.

A subset constituted of adjacent light beams forms a single pixel on the image recording medium.

Accordingly, an object of the present invention is to provide an image recorder capable of recording an image on a recording medium with sufficient beam intensity.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
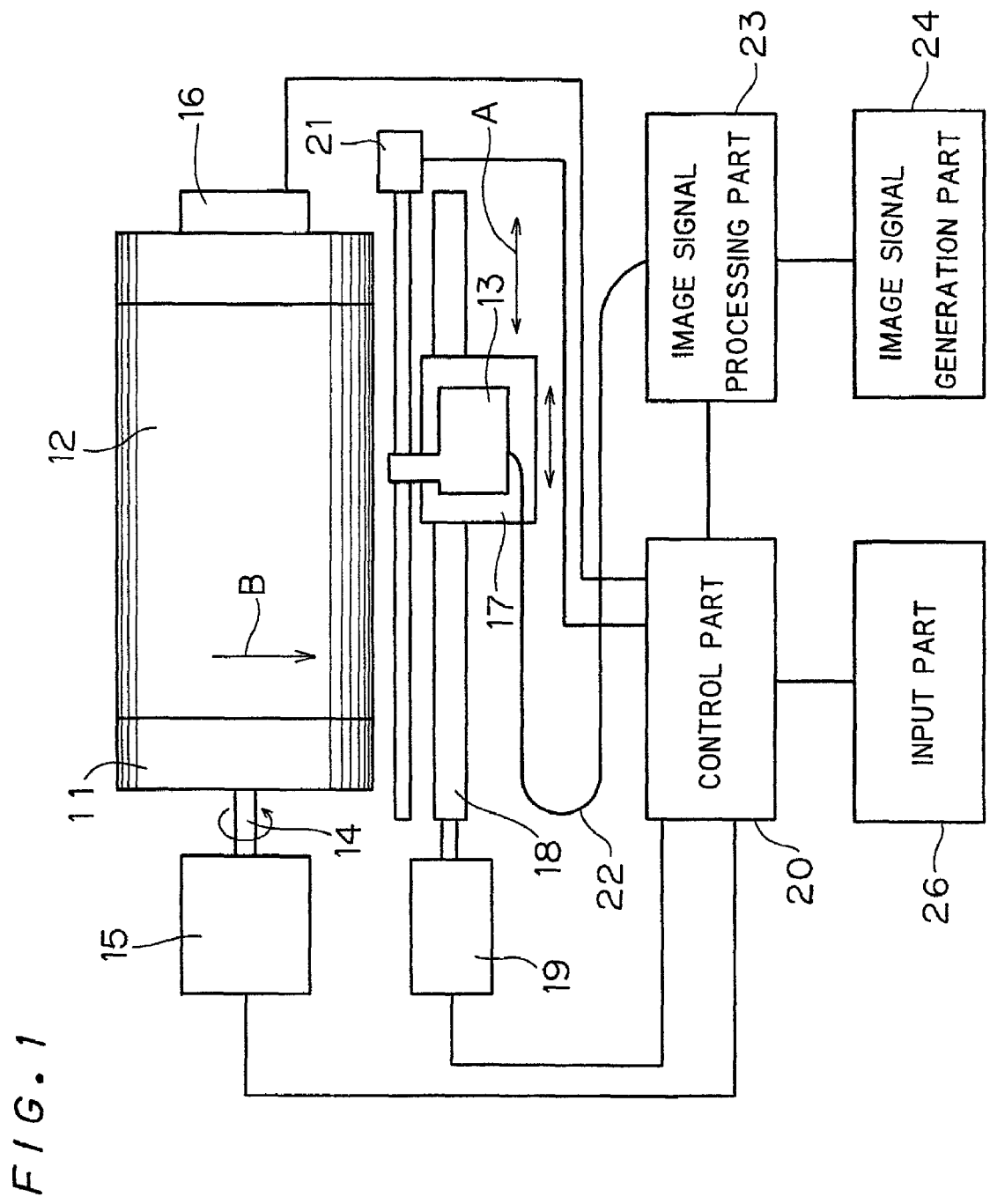
FIG. 1 schematically illustrates an image recorder to which a preferred embodiment of the present invention is applied.

FIG. 1 schematically illustrates an image recorder to which preferred embodiments of the present invention is applied.

This image recorder comprises a drum 11 around which a photosensitive medium 12 such as a film or a printing plate is wound and a recording head 13 for applying a modulated laser beam to the medium 12 mounted on the drum 11.

The drum 11 is connected to a main scanning motor 15 through a shaft 14. Therefore, the drum 11 is driven by the main scanning motor 15 to rotate about the shaft 14. A rotary encoder 16 monitors the position of the rotational angle of the drum 11.

The recording head 13 is placed on a table 17. The table 17 is connected to a subscanning feeding mechanism 18, comprising a ball screw (not shown) and a guide member (not shown). Furthermore, the ball screw is connected with a subscanning motor 19. Therefore, the recording head 13 is driven by the subscanning motor 19 to reciprocate in the axial direction (subscanning direction shown by arrow A in FIG. 1) of the drum 11. A linear encoder 21 monitors the position of the recording head 13 in the subscanning direction.

The recording head 13 is connected with an image signal processing part 23 through a movable cable bundle 22. The image signal processing part 23 processes image signals transmitted from an image signal generation part 24, and thereafter transmits the processed image signals to the recording head 13.

The image recorder further comprises a control part 20 for controlling the overall image recorder. The control part 20 is connected with the main scanning motor 15, the rotary encoder 16, the subscanning motor 19 and the linear encoder 21. The control part 20 is also connected with an input part 26 comprising input means such as a keyboard and display means such as a display.

The control part 20 is also connected with the aforementioned image signal processing part 23. The control part 20 controls processing of the image signal in the image signal processing part 23, and transmits a control signal for controlling driving of the recording head 13 to the recording head 13 through the image signal processing part 23 and the movable cable bundle 22.

This image recorder rotates the drum 11 at a high speed thereby moving the medium 12 in the main scanning direction shown by arrow B in FIG. 1 while moving the recording head 13 in the subscanning direction shown by arrow A. The recording head 13 applies laser beams modulated in response to the image signals to the medium 12, thereby recording a desired image on the medium 12.

Figure 2:
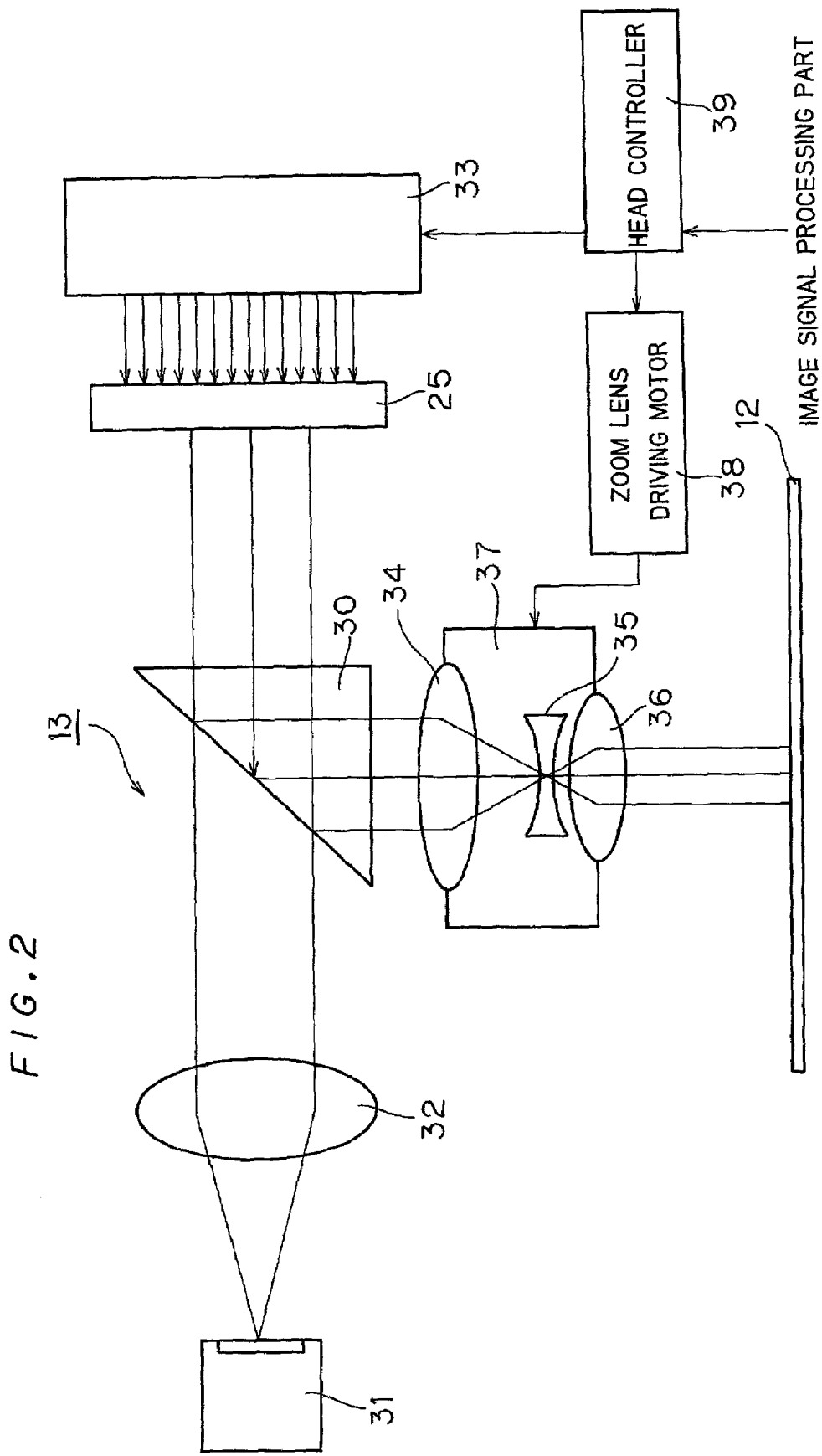
FIG. 2 schematically illustrates a principal part of a recording head 13 according to a first preferred embodiment of the present invention along with a recording medium 12.

FIG. 2 illustrates a principal part of a recording head 13 according to a first preferred embodiment of the present invention along with a medium 12.

This recording head 13 comprises a laser light source 31, an illumination lens 32, a Grating Light Valve™ 25, a light valve driving circuit 33, a total internal reflection prism 30, a zoom lens 37 consisting of a plurality of lenses 34, 35 and 36 for serving as a focusing optical system, a zoom lens driving motor 38 and a head controller 39.

The laser light source 31 is a bar laser (broad area semiconductor laser) with a number of emitters, and high-power laser beams radiating from the emitters can be overlapped on a rectangular area.

The laser beam emitted from the laser light source 31 is applied onto the Grating Light Valve™ 25 due to the illumination lens 32. The laser beam divided into a number of laser beams and modulated in the Grating Light Valve™ 25 is reflected by the total internal reflection prism 30 so that the optical path thereof is bent, and thereafter passes through the zoom lens 37 to be focused on the medium 12 mounted on the surface of the drum 11.

In the image recorder having the aforementioned structure, an image signal transmitted from the image signal processing part 23 shown in FIG. 1 is transmitted to the light valve driving circuit 33 for the Grating Light Valve™ 25 through the head controller 39 shown in FIG. 2. The Grating Light Valve™ 25 modulates the laser beam emitted from the laser light source 31 in response to the image signal, for recording an image with the modulated laser beam.

The control signal transmitted from the control part 20 shown in FIG. 1 through the image signal processing part 23 is transmitted to the zoom lens driving motor 38 through the head controller 39 shown in FIG. 2. The zoom lens driving motor 38 moves the plurality of lenses 34, 35 and 36 in response to the control signal, for changing a focusing magnification by the zoom lens 37.

Figure 3:
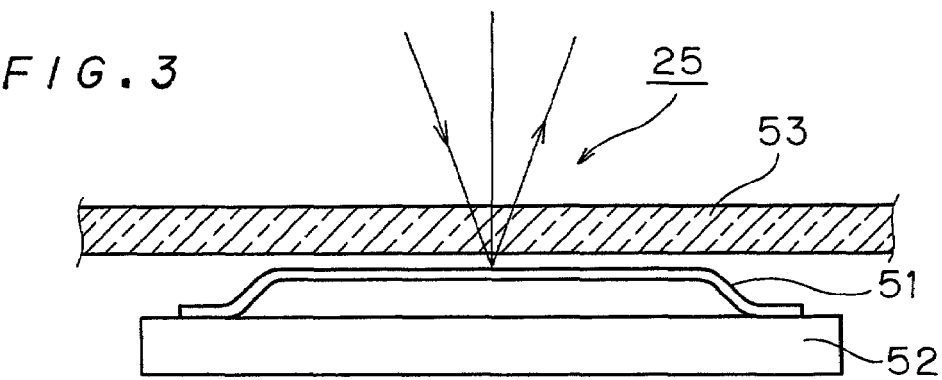
FIG. 3 is a schematic side elevational view showing a principal part of a Grating Light Valve™ 25.
Figure 4:
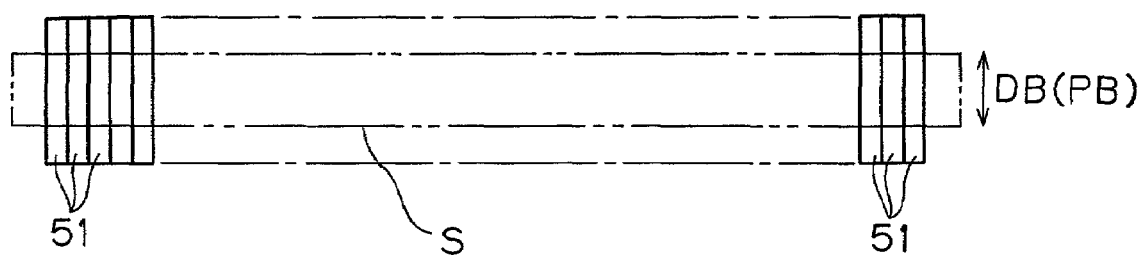
FIG. 4 is a plan view typically showing reflecting elements (ribbons) 51 in the Grating Light Valve™ 25.
Figure 5:
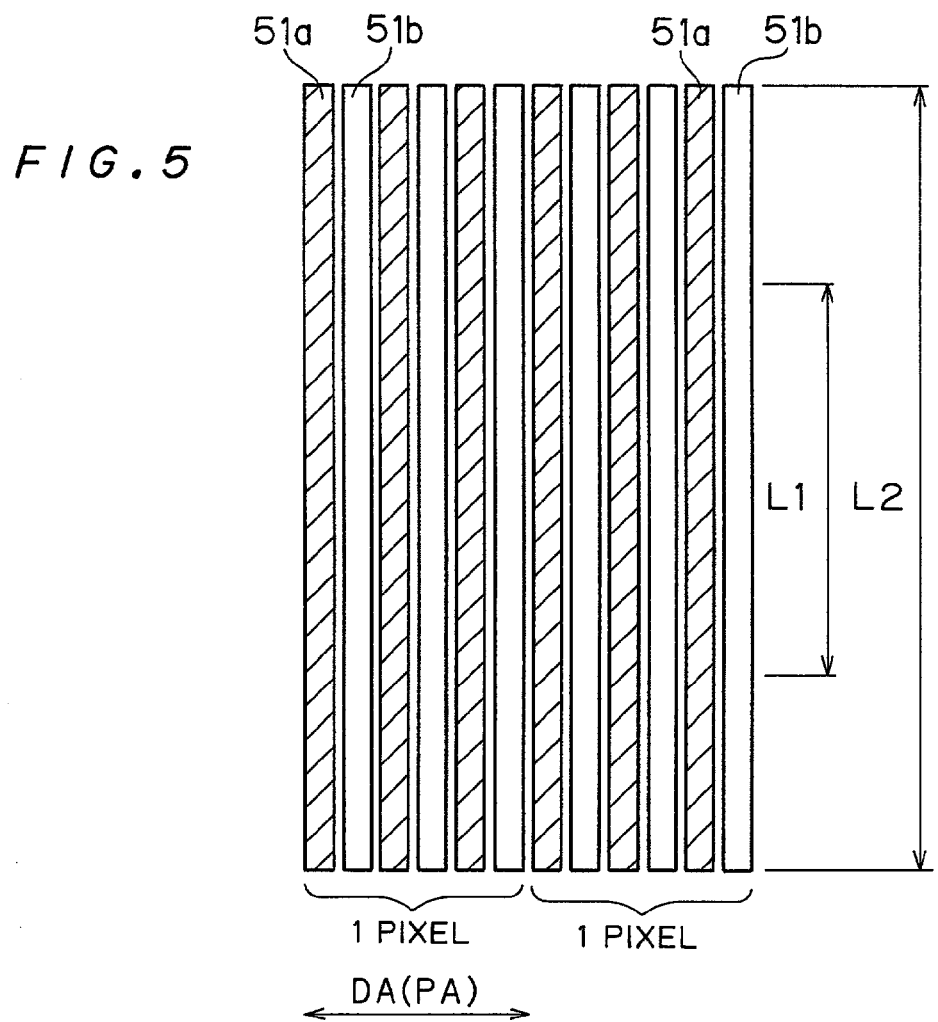
FIG. 5 is a partially enlarged view of FIG. 4.
Figure 6:
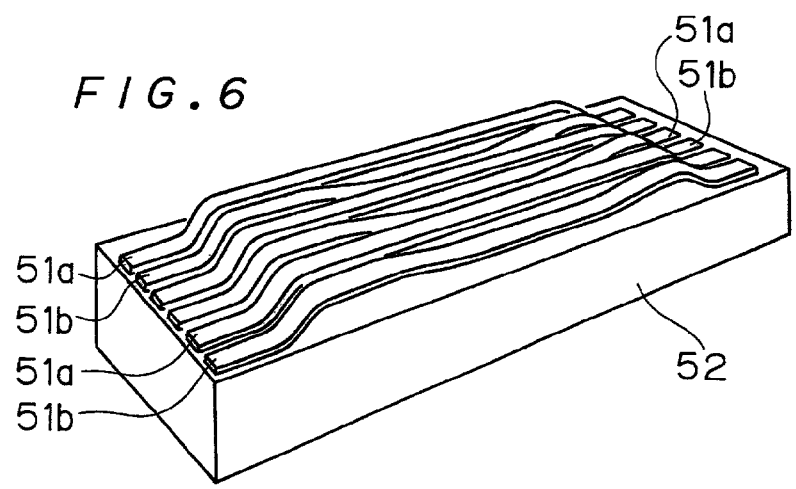
FIG. 6 is a perspective view showing the ribbons 51 for a single pixel in the Grating Light Valve™ 25 along with a support member 52.

The structure of the Grating Light Valve™ 25 employed for the recording head 13 is now described. FIG. 3 is a schematic side elevational view showing a principal part of the Grating Light Valve™ 25. FIG. 4 is a plan view typically showing ribbons 51 in the Grating Light Valve™ 25, and FIG. 5 is a partially enlarged view thereof. FIG. 6 is a perspective view showing the ribbons 51 for one pixel in the Grating Light Valve™ 25 along with a support member 52.

As shown in FIGS. 3 to 6, the Grating Light Valve™ 25 is formed by transversely arranging thousands of ribbons 51 on the support member 52 in parallel with each other. A glass window 53 is closely arranged above the ribbons 51 in parallel with the ribbons 51, as shown in FIG. 3.

As shown in FIGS. 5 and 6, the ribbons 51 consist of alternately arranged fixed ribbons 51a and active ribbons 51b. These ribbons 51a and 51b are hereinafter generically referred to as "ribbons 51". While each fixed ribbon 51a remains at rest, an active ribbon 51b with an effective length of L1 and a total length of L2 moves downward in response to voltage applied thereto, as shown in FIGS. 5 and 6. Six ribbons 51 consisting of three fixed ribbons 51a and three active ribbons 51b form a single pixel on the Grating Light Valve™ 25.

When no voltage is applied to the active ribbons 51b in the Grating Light Valve™ 25, all fixed ribbons 51a and all active ribbons 51b are flush with each other. When voltage is applied to the active ribbons 51b, they move downward by a distance corresponding to ¼ of the wavelength of the laser beam as shown in FIG. 6, to act as a reflective diffraction grating.

Therefore, the Grating Light Valve™ 25 reflects the incident laser beam like a plane mirror when no voltage is applied to the active ribbons 51b, while creating ±1st order diffracted beams as well as higher-order diffracted beams when voltage is applied to the active ribbons 51b.

If the laser beam is applied to a rectangular area S, covering the effective area of the ribbons 51 of the Grating Light Valve™ 25 as shown by two-dot chain lines in FIG. 4, then, hundreds of laser beams can be modulated independently.

The size, DA, of each laser beam along the direction of arrangement (subscanning direction) is six times a ribbon width, as shown in FIG. 5, and the size of each laser beam along the direction (main scanning direction) perpendicular to the direction of arrangement is defined by the width DB of the rectangular area S, as shown in FIG. 4.

A conventional image recorder using a light valve divides the laser beam emitted from the laser light source 31 into hundreds of image recording laser beams whose power could be insufficient for recording a low sensitivity medium.

Therefore, this image recorder uses a laser beam set composed of N (N: integer of at least two; N=2 in the first preferred embodiment) laser beams in a subscanning direction for recording a pixel on the medium 12.

Figure 7:
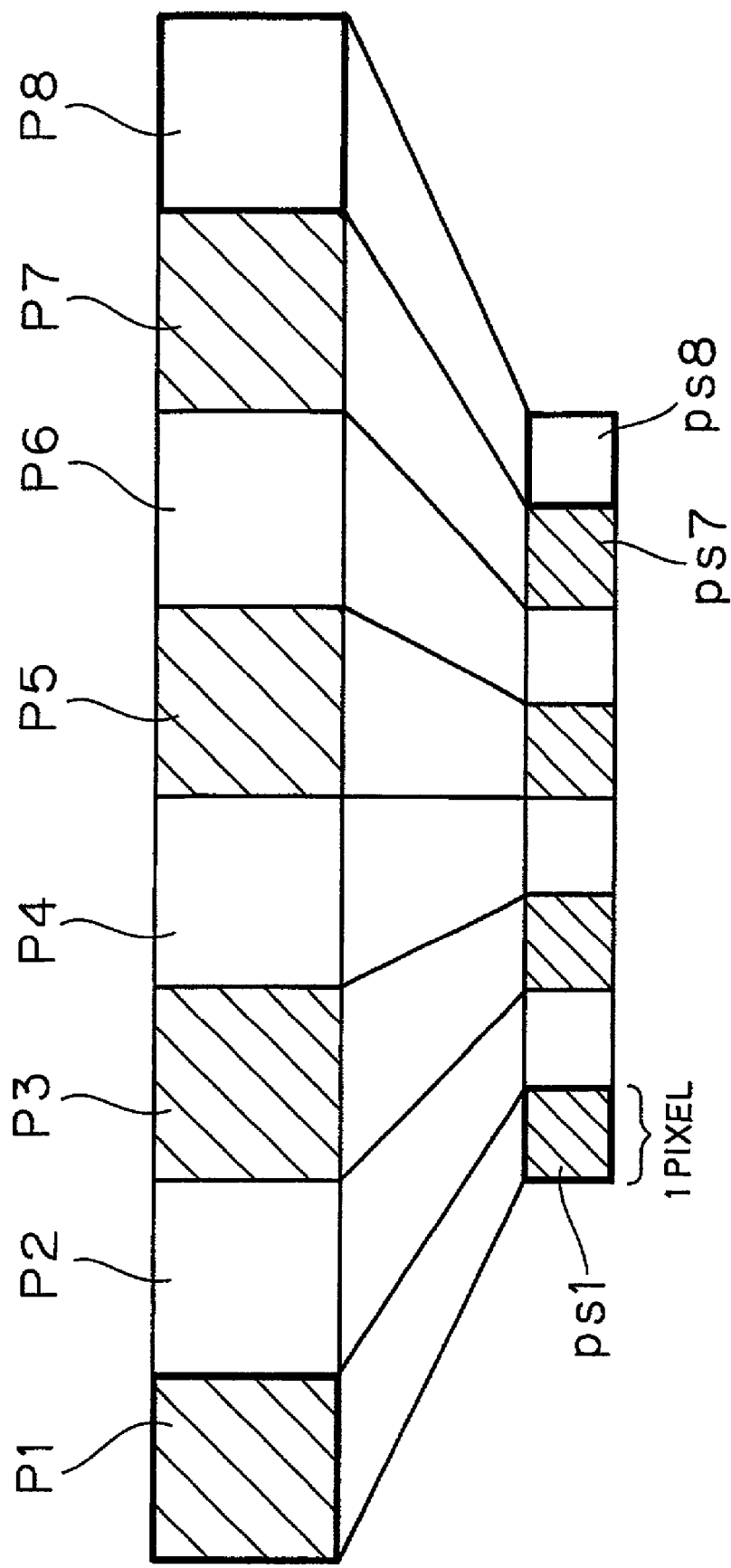
FIGS. 7 and 8 are explanatory diagrams showing the relation between laser beams P1 to P8 each reflected by six ribbons in the light valve and laser spots ps1 to ps8 focused on the medium 12 by a zoom lens serving as a focusing optical system.
Figure 8:
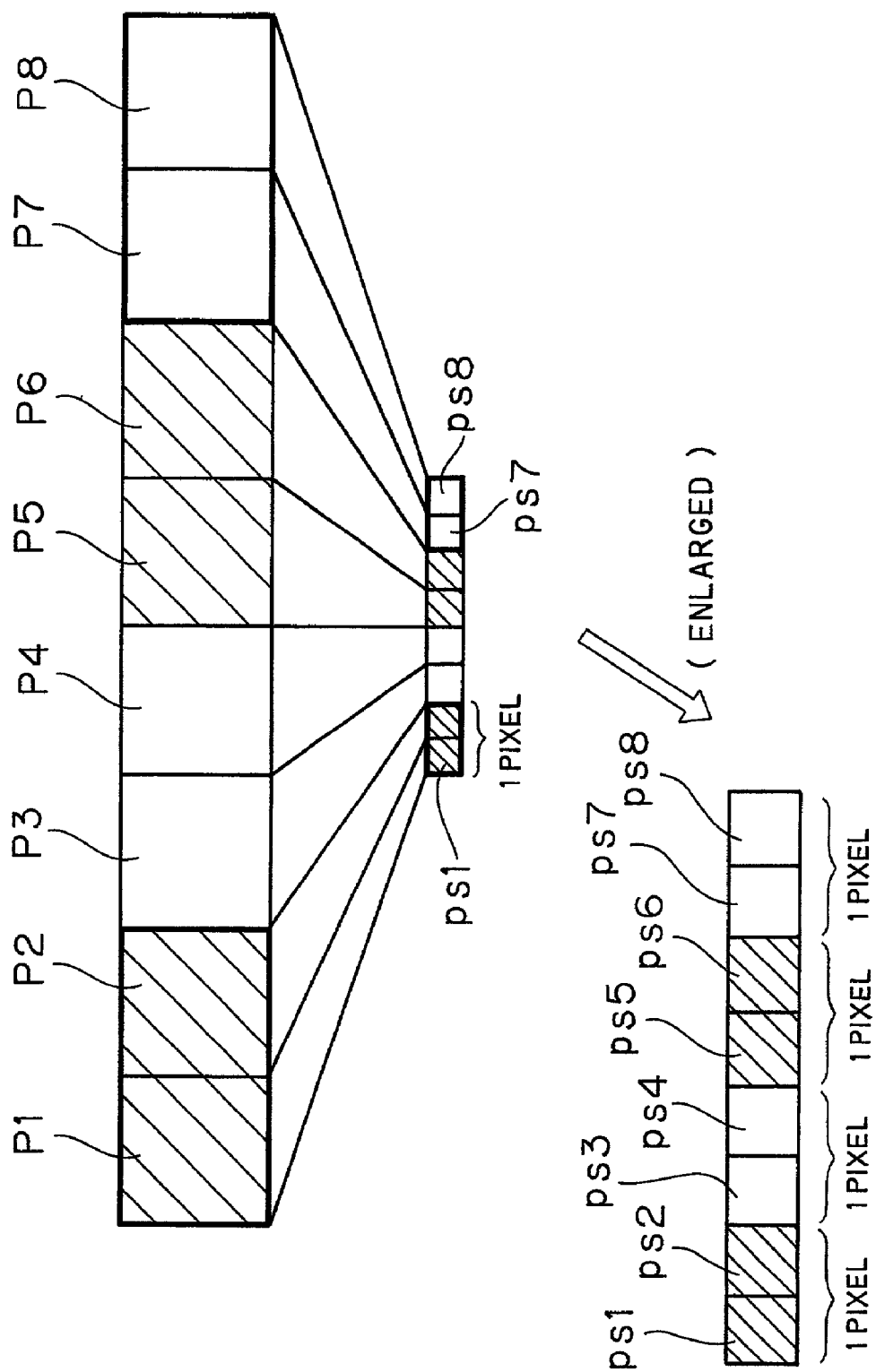

This point is now described with reference to FIGS. 7 and 8. FIGS. 7 and 8 are explanatory diagrams showing the relation between laser beams P1 to P8 reflected by the Grating Light Valve™ 25 and laser beams (beam spots) ps1 to ps8 focused on the medium 12 through the zoom lens 37. The magnification of the zoom lens 37 is 0.5× in FIG. 7 and 0.25× in FIG. 8, respectively.

A conventional image recorder images eight pixels with eight laser beams (beam spots) ps1 to ps8 formed by focusing the laser beams P1 to P8, as shown in FIG. 7. On the other hand, the image recorder according to the first preferred embodiment images a single pixel with a laser beam set (ps1+ps2, ps3+ps4, ps5+ps6, or ps7+ps8) formed by two laser beams adjacent to each other in the subscanning direction.

In the image recorder according to the first preferred embodiment, the image signal processing part 23 generates an image signal for synchronously modulating pairs of laser beams adjacent to each other in the subscanning direction and transmits the image signal to the diffraction type light valve driving circuit 33. The control part 20 controls the zoom lens driving motor 38 so that the magnification of the zoom lens 37 is half that shown in FIG. 7, in order to maintain the size of a single pixel when imaging the single pixel with a pair of laser beams (P1+P2, P3+P4, P5+P6, or P7+P8) adjacent to each other in the subscanning direction.

Due to the aforementioned structure, the power of laser beams for imaging a single pixel on the medium 12 can be doubled as compared with that of the prior art; moreover, the power density can be quadrupled. Likewise, if three beams form a single pixel, the power is tripled and the power density is nine times that of the prior art.

Such configuration gives a sufficient beam intensity for imaging a thermal material with a reciprocity law failure.

The Grating Light Valve™ is the most preferred light valve for the present invention. Because the Grating Light Valve™ has no discernible boundary between pixels, a pixel profile on the medium has no significant dip due to a pixel boundary on the light valve even if a plurality of light beams image a single pixel on the medium 12.

As mentioned above, the beam size in the subscanning direction on the medium 12 ought to be determined by a combination of the subset beam number, N, and the magnification of the zoom lens. However, the beam size in the main scanning direction can be set at a prescribed valve in consideration of media characteristics.

Figure 9:
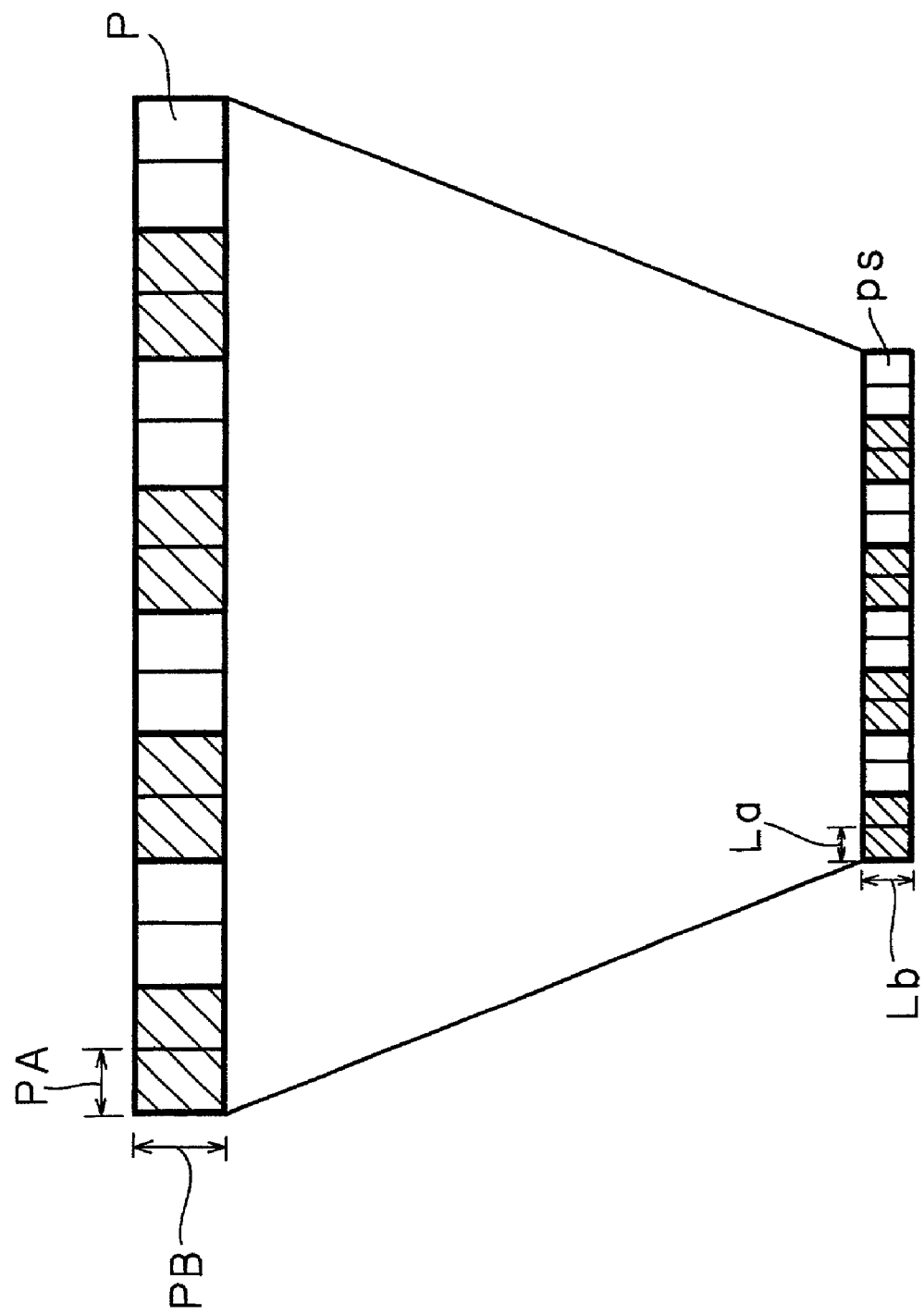
FIG. 9 is an explanatory diagram showing the relation between the size of a laser beam P each reflected by six ribbons in the light valve 25 and the size of a laser spot ps focused on the medium 12 by the zoom lens 37 in a case of recording an image of a single pixel with two laser beams adjacent to each other in a subscanning direction.

This point is now described. FIG. 9 is an explanatory diagram showing the relation between the size of a laser beam P reflected by a single pixel on the Grating Light Valve™ 25 and the size of a laser beam (beam spot) ps focused by the zoom lens 37 in a case of imaging a single pixel with two laser beams adjacent to each other in the subscanning direction.

It is assumed that the symbol PA represents the size of a single pixel P on the Grating Light Valve™ 25 in the subscanning direction (direction of arrangement of the laser beams) and the symbol PB represents the size of the pixel P in the main scanning direction (direction perpendicular to the direction of arrangement of the laser beams).

The sizes La and Lb of the laser beam ps focused on the medium 12 in the subscanning direction and the main scanning direction are proportionate to the aforementioned lengths PA (DA) and PB (DB) respectively.

The width of the rectangular area S irradiated by the laser beam on the Grating Light Valve™ 25 determines the ratio between the lengths La and Lb of the laser beam ps focused on the medium 12 in the subscanning direction and the main scanning direction.

When a single pixel on the medium 12 is imaged by N adjacent beams, the sizes Lb is desired to be between La and N times La.

$$La \leq Lb \leq (N \times La)$$

This is because Lb smaller than La requires a very narrow illumination that is very difficult to achieve and because Lb larger than N×La creates an elongated spot along the main scanning direction, which may deteriorate the image quality. Nevertheless to say, Lb equals La if N is unity.

When the medium 12 is made of a thermal material or the like reduced in sensitivity and liable to cause reciprocity law failure if the laser beam has low illuminance and the power density is so insufficient that the image cannot be properly recorded, therefore, Lb should be so close to La that the power density is high enough. If sensitive material is used, Lb should be close to N×La to minimize the power density on the ribbons 51.

It would be safe to substitute DA and DB for La and Lb, respectively, in the above inequality because the ratio, DA/DB, equals the ratio, La/Lb unless the zoom lens 37 has any distortion.

Figure 10:
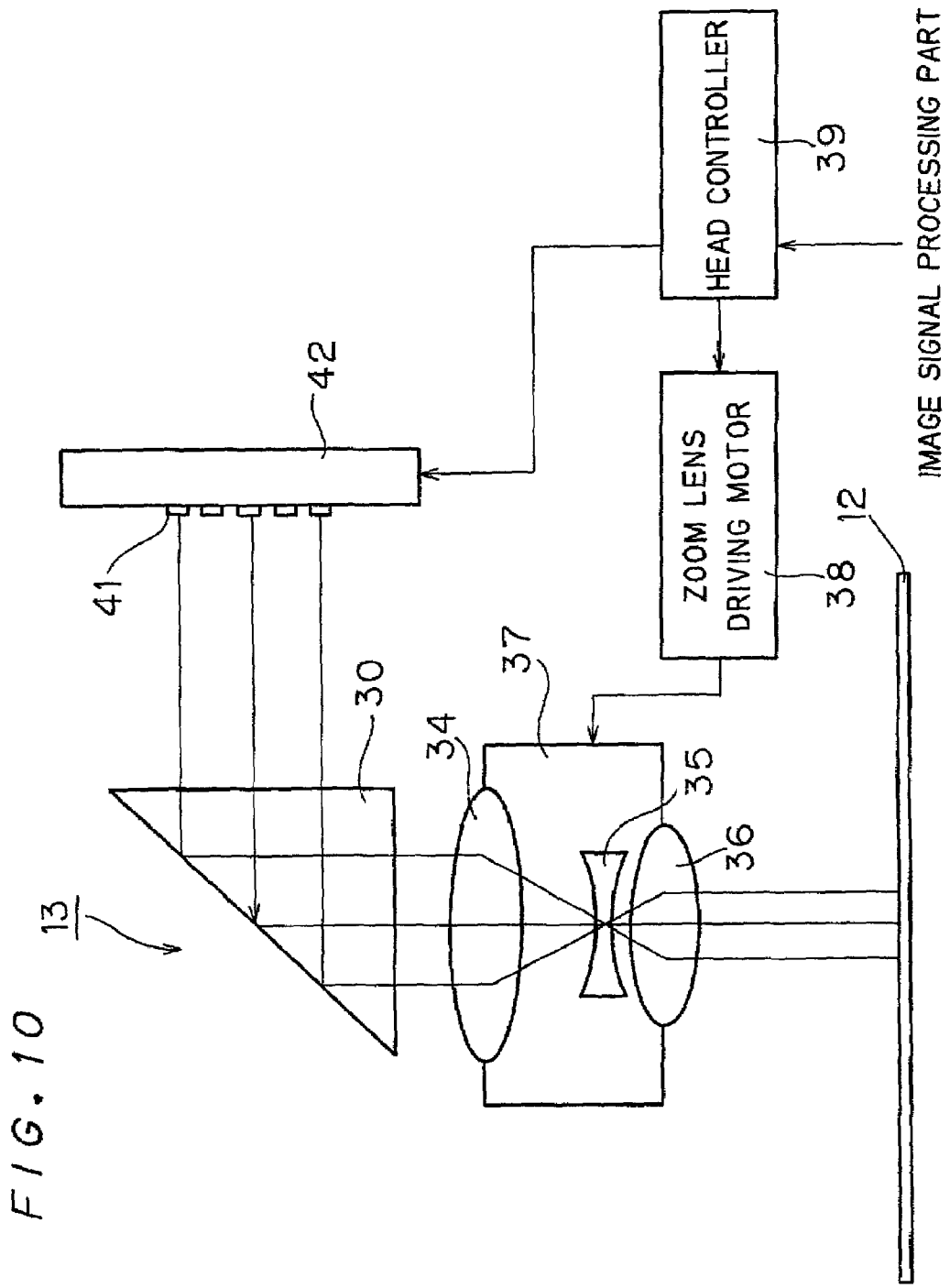
FIG. 10 schematically illustrates a principal part of a recording head 13 according to a second preferred embodiment of the present invention along with a medium 12.

A recording head 13 according to a second preferred embodiment of the present invention is now described. FIG. 10 schematically illustrates a principal part of the recording head 13 according to the second preferred embodiment of the present invention along with a medium 12. Members of the recording head 13 according to the second preferred embodiment identical to those of the recording head 13 according to the first preferred embodiment are denoted by the same reference numerals, to omit redundant description.

The recording head 13 according to the second preferred embodiment employs an array light source 42 such as an LED array having a plurality of light emitting devices 41, each having low beam brightness, arranged in a subscanning direction.

In the recording head 13 according to the second preferred embodiment, the modulated light beams emitted from the array-type light source 42 are reflected by a total internal reflection prism 30 so that the optical paths thereof are bent, and thereafter pass through a zoom lens 37 to be focused on the medium 12 mounted on the surface of a drum 11.

Also when the recording head 13 according to the second preferred embodiment is employed, an image can be recorded on the medium 12 with sufficient power density by recording an image of each pixel with N (N≧2) adjacent laser beams, similarly to the case of the aforementioned first preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. An image recorder optically scanning an image recording medium in a main scanning direction and a subscanning direction for recording an image on said image recording medium, comprising:
   a light source emitting a first light beam;
   a spatial light modulator dividing said first light beam into a plurality of second light beams arranged at least in said subscanning direction while modulating said plurality of second light beams in response to image signals;
   a focusing optical system for focusing said plurality of second light beams on a recording medium; and
   a main scanning system for scanning said recording medium with said plurality of second light beams in said main scanning direction, wherein
      said plurality of second light beams constitute a plurality of beam subsets,
      each beam subset consists of N adjacent light beams in said subscanning direction, where the number N is an integer of at least two, and
      said plurality of light beams belonging to each said beam subset are synchronously modulated by a single image signal for a single pixel so that each pixel on said recording medium is recorded by a single beam subset,
   whereby power density for recording each pixel is increased in response to the square of the number N.

2. The image recorder according to claim 1, satisfying the following inequality:

$$La \leq Lb \leq (N \times La)$$

where La represents the size of a beam spot, formed by each second light beam on said recording medium, in said subscanning direction, and
   Lb represents the size of said beam spot in said main scanning direction.

3. The image recorder according to claim 1, further comprising:
   a numerical value changing element for changing the number N in response to light intensity required for image recording, and
   a magnification changing element for changing a magnification of said focusing optical system in response to the number N changed by said numerical value changing element.

4. The image recorder according to claim 1, wherein
   said spatial light modulator is a light valve with no discernible boundaries between adjacent modulating elements.

5. The image recorder according to claim 4, wherein said light valve is the Grating Light Valve™.

6. An image recorder optically scanning an image recording medium in a main scanning direction and a subscanning direction for recording an image on said image recording medium, comprising:
   a light source emitting a plurality of modulated light beams from a plurality of light emitting devices arranged in said subscanning direction;
   a focusing optical system focusing said plurality of light beams on a recording medium; and
   a main scanning system for scanning said recording medium with said plurality of light beams in said main scanning direction, wherein
      said plurality of light beams constitute a plurality of beam subsets,
      each beam subset consists of N adjacent light beams in said subscanning direction, where the number N is an integer of at least two, and
      said plurality of light beams belonging to each said beam subset are synchronously modulated by a single image signal for a single pixel so that each pixel on said recording medium is recorded by a single beam subset,
   whereby power density for recording each pixel is increased in response to the square of the number N.

7. The image recorder according to claim 5, satisfying the following inequality:

$$La \leq Lb \leq (N \times La)$$

where La represents the size of a beam spot, formed by each light beam on said recording medium, in said subscanning direction, and
   Lb represents the size of said beam spot in said main scanning direction.

8. The image recorder according to claim 6, further comprising:
   a numerical value changing element for changing the number N in response to light intensity required for image recording, and
   a magnification changing element for changing a magnification of said focusing optical system in response to the number N changed by said numerical value changing element.

* * * * *